United States Patent Office 2,871,199
Patented Jan. 27, 1959

2,871,199

MANUFACTURE OF SOLID PHOSPHORIC ACID CATALYSTS

Mitchell S. Bielawski, Berwyn, Ill., assignor to Universal Oil Products Company, Des Plaines, Ill., a corporation of Delaware No Drawing. Application October 11, 1954
Serial No. 461,686

12 Claims. (Cl. 252—435)

This invention relates to the manufacture of solid catalysts which are useful in accelerating various reactions among organic compounds, and particularly reactions involving unsaturated organic compounds.

More particularly, this invention relates to the preparation of a particular type of an improved solid phosphoric acid catalyst which is active in accelerating direct olefin conversion reactions, particularly olefin polymerization reactions.

An object of this invention is to provide a process for preparing an improved solid phosphoric acide catalyst which is utilizable in promoting hydrocarbon conversion reactions.

A further object of this invention is to provide an improved solid phosphoric acid catalyst which is useful in the polymerization of olefinic hydrocarbons, said catalyst having a relatively high degree of activity and after use crushing strength.

One embodiment of this invention resides in a process for the manufacture of a solid phosphoric acid catalyst wherein a polycyclic aromatic hydrocarbon is added to a solid siliceous adsorbent and the resulting mixture composited with a phosphoric acid, after which the resulting composite is extruded and calcined.

A specific embodiment of the invention is found in a process for the manufacture of a solid phosphoric acid catalyst which comprises admixing naphthalene dissolved in carbon tetrachloride with a siliceous adsorbent, compositing the mixture with a phosphoric acid, removing the carbon tetrachloride and subjecting the remaining mixture to extrusion and calcination at a temperature in the range of from about 600° to about 1200° F.

A still more specific embodiment of this invention is found in a process for the manufacture of a solid phosphoric acid catalyst which comprises admixing from about 1 to about 20 parts by weight of naphthalene dissolved in carbon tetrachloride with from about 20 to about 45 parts by weight of a diatomaceous earth adsorbent, removing the carbon tetrachloride, compositing the remaining mixture with from about 50 to about 75 parts by weight of polyphosphoric acid, subjecting the composited mixture to extrusion, heating, and calcination at a temperature in the range of from about 600° to about 1200° F. for a period of time in the range of from about 1 to about 8 hours.

Other objects and embodiments of this invention will be found in the following further detailed description of said invention.

It has now been discovered that the activity and after use crushing strength of a solid phosphoric acid catalyst in direct olefin conversion reactions such as the polymerization of olefins, may be raised to a higher level by preparing the catalyst composite from a mixture of a polycyclic aromatic hydrocarbon, a phosphoric acid and a siliceous adsorbent. In the process of the present invention the starting material for the catalytic composite will comprise an acid of phosphorous such as orthophosphoric acid, pyrophosphoric acid, triphosphoric acid, tetraphosphoric acid; a polycyclic aromatic hydrocarbon and a siliceous adsorbent, the polycyclic aromatic hydrocarbon and the siliceous adsorbent being admixed before compositing with the phosphoric acid.

It is contemplated within the scope of this invention that the polycyclic aromatic hydrocarbon present in the mixture will comprise from about 2.2 to about 100% by weight of the siliceous material, and preferably in the range of from about 27 to 47% by weight. Polycyclic aromatic hydrocarbons which may be used in this invention include naphthalene, anthracene, phenanthrene, pyrene, triphenylene; alkyl-substituted polycyclic aromatic hydrocarbons such as α-methyl naphthalene, β-methyl naphthalene, α-ethyl naphthalene, β-ethyl naphthalene, α,β-dimethyl naphthalene, α-methyl anthracene, β-methyl anthracene, γ-methyl anthracene, α,β-dimethyl anthracene, α,β,γ-trimethyl anthracene, α-ethyl anthracene, β-ethyl anthracene, etc.

In the process of this invention the polycyclic aromatic hydrocarbon preferably dissolved in an inert organic solvent, such as carbon tetrachloride, benzene, toluene, ethyl ether, etc. is first admixed with the siliceous adsorbent material, after which the volatile organic solvent is removed by conventional means. The particular phosphoric acid which is selected for the desired catalyst and the dry powdered mixture of polycyclic aromatic hydrocarbon and siliceous adsorbent are then admixed at temperatures ranging from about 50° to about 500° F. to form a composite in which the phosphoric acid content is usually in major proportion by weight. If so desired the phosphoric acid may be preheated before the addition of the polycyclic aromatic hydrocarbon-siliceous adsorbent mixture. The composite thus formed by the siliceous adsorbent-polycyclic aromatic hydrocarbon and the phosphoric acid is a slightly moist to almost dry material which has a suitable consistency for extrusion. The composite is then extruded by suitable means, for example, a hydraulic press, and subjected to heating. After this preliminary heating, the extruded catalyst composite is then subjected to calcination at temperatures ranging from about 600° to about 1200° F. for a period of time ranging from about 1 to about 8 hours to form a substantially solid granular catalytic material. The calcination of the formed particles of catalyst is usually carried out in an atmosphere of inert gases such as air, nitrogen, flue gas, and the like. During this calcination, the volatile polycyclic aromatic hydrocarbon is driven out of the composite, thus leaving a composite consisting substantially of the phosphoric acid and the siliceous adsorbent.

One of the essential and active ingredients of the solid catalysts which are manufactured by the process of this invention for use in organic reactions is an acid of phosphorus, preferably one in which the phosphorus has a valence of 5. The acid may constitute from about 53% to about 79% of the catalyst mixture ultimately produced. Of the various acids of phosphorus, orthophosphoric acid ($H_3PO_4$) and pyrophosphoric acid ($H_4P_2O_7$) find general application in the primary mixtures, due mainly to the cheapness and to the readiness with which they may be procured, although the invention is not restricted to their use, but may employ any of the other acids of phosphorus insofar as they are adaptable. However, it is not intended to infer that the different acids of phosphorus which may be employed will produce catalysts which have identical effects upon any given organic reactions as each of the catalysts produced from different acids and by slightly varying procedures will exert its own characteristic action.

In using orthophosphoric acid as one of the primary ingredients, different concentrations of the aqueous solutions may be employed, for example, acid containing from approximately 75 to 100% $H_3PO_4$ or orthophosphoric acid containing some free phosphorus pentoxide may be used. By this is meant that the ortho acid may contain a definite percentage of the pyro acid corresponding to the primary phase of dehydration of orthophosphoric acid. Within these concentration ranges the acids will be liquids of varying viscosities and readily mixed with solid siliceous adsorbents.

Triphosphoric acid which may be represented by the formula: $H_5P_3O_{10}$ may also be used as one of the starting materials for the preparation of the catalyst of this invention. These catalytic compositions may also be prepared from the polycyclic aromatic hydrocarbons, the siliceous adsorbents, and a phosphoric acid mixture containing orthophosphoric acid, pyrophosphoric acid, triphosphoric acid and other polyphosphoric acids.

A phosphoric acid mixture which is generally referred to as polyphosphoric acid may also be employed in this process. Polyphosphoric acid is formed by heating orthophosphoric acid or pyrophosphoric acid or mixtures thereof in suitable equipment such as carbon lined trays heated by flue gases or other suitable means to produce a phosphoric acid mixture generally analyzing from about 79% to about 85% by weight of $P_2O_5$. Such a liquid mixture of phosphoric acids with 79.4% $P_2O_5$ content was found by analysis to contain 24.5% of orthophosphoric acid ($H_3PO_4$), 45.2% of pyrophosphoric acid ($H_4P_2O_7$), 26.0% of triphosphoric acid ($H_5P_3O_{10}$), and 4.3% by weight of unidentified phosphoric acids. Another polyphosphoric acid mixture somewhat more concentrated than the one just referred to and having a $P_2O_5$ content of 84% by weight was found by analysis to contain about 57% by weight of triphosphoric acid ($H_5P_3O_{10}$), 17% by weight of hexametaphosphoric acid ($HPO_3)_6$, 11% by weight of pyrophosphoric acid ($H_4P_2O_7$), 5% by weight of orthophosphoric acid ($H_3PO_4$) and 10% by weight of unidentified phosphoric acids.

Another acid of phosphorus which may be employed in the manufacture of a composite catalyst according to the present invention is tetraphosphoric acid. It has the general formula: $H_6P_4O_{13}$ which corresponds to the double oxide formula: $3H_2O.2P_2O_5$ which in turn may be considered as resulting when three molecules of water are lost by four molecules of orthophosphoric acid $H_3PO_4$. The tetraphosphoric acid may be manufactured by gradual or controlled dehydration or heating of orthophosphoric acid and pyrophosphoric acid or by adding phosphoric pentoxide to these acids in proper amounts. When the latter procedure is followed, phosphoric anhydride is added gradually until it amounts to 520% by weight of total water present. After a considerable period of standing at ordinary temperature, the crystals of the tetraphosphoric acid separate from the viscous liquid and it is found that these crystals melt at approximately 93° F. and have a specific gravity of 1.1886 at a temperature of 60° F. However, it is unnecessary to crystallize the tetraphosphoric acid before employing it in the preparation of the solid catalyst inasmuch as the crude tetraphosphoric acid mixture may be incorporated with the polycyclic aromatic hydrocarbon and the solid siliceous adsorbent.

The materials which may be employed as adsorbents or carriers for oxygen acids of phosphorus are divided roughly into two classes. The first class comprises materials of predominantly siliceous character and includes diatomaceous earth, kieselguhr, and artificially prepared porous silica. The second class of materials which may be employed either along with or in conjunction with the first class comprises generally certain members of the class of aluminum silicates and includes such naturally occurring substances as various fuller's earths and clays such as bentonite, montmorillonite, acid treated clays and the like. Each adsorbent or supporting material which may be used will exert its own specific influence upon the net effectiveness of the catalyst composite which will not necessarily be identical with that of other members of the class.

The resulting catalyst which has been calcined is active for promoting the polymerization of olefinic hydrocarbons, particularly for polymerizing normally gaseous olefinic hydrocarbons to form normally liquid hydrocarbons suitable for use as constituents of gasoline. When employed in the conversion of olefinic hydrocarbons into polymers, the calcined catalyst formed as hereinbefore set forth, is preferably employed as a granular layer in a heated reactor which is generally made from steel, and through which the preheated hydrocarbon fraction is directed. Thus, the solid catalyst of this process may be employed for treating mixtures of olefin-containing hydrocarbon vapors to effect olefin polymerization, but the same catalyst may also be used at operating conditions suitable for maintaining liquid phase operation during polymerization of olefinic hydrocarbons such as butylenes, to produce gasoline fractions. When employed in the polymerization of normally gaseous olefins, the formed and calcined catalyst particles are generally placed in a vertical, cylindrical treating tower and the olefin-containing gas mixture is passed downwardly therethrough at a temperature of from about 350° to about 550° F. and at a pressure of from about 100 to about 1500 p. s. i. These conditions are particularly applicable when dealing with olefin-containing material such as stabilizer reflux which may contain from approximately 10 to 50% or more of propylene and butylenes. When operating on a mixture comprising essentially butanes and butylenes, this catalyst is effective at conditions favoring the maximum utilization of both normal butylenes and isobutylene which involves mixed polymerization at temperatures from about 250° to about 325° F. and a pressure of from about 500 to about 1500 p. s. i.

In utilizing the catalyst of this invention for promoting miscellaneous organic reactions, the catalysts will be employed in essentially the same way as they are used when polymerizing olefins in that the reactions are essentially in the vapor phase, and that they also may be employed in suspension in liquid phase in various types of equipment.

With suitable modifications in the details of operation, the present type of catalyst may be employed in a large number of organic reactions including polymerization of olefins as already mentioned. Typical cases of reactions in which the present type of catalyst may be used include the alkylation of cyclic compounds with olefins, the cyclic compounds including aromatics, polycyclic compounds, naphthenes and phenols; condensation reactions such as those occurring between ethers and aromatics, alcohols and aromatics, phenols and aldehydes, etc.; reactions involving the hydrohalogenation of unsaturated organic compounds; isomerization reactions; ester formation by the interaction of carboxylic acids and olefins; and the like. The specific procedures for utilizing the present type of catalyst in miscellaneous organic reactions will be determined by the chemical and physical characteristics and the phase of the reacting constituents.

During use of these catalysts in vapor phase polymerization and other vapor phase treatments of organic compounds, it is often of value to add small amounts of moisture to prevent excessive dehydration and subsequent decrease in catalyst activity. In order to substantially prevent loss of water from the catalyst, an amount of water or water vapor, such as steam is added to the charged olefin-containing gas so as to substantially balance the vapor pressure of the catalyst. This amount of water vapor varies from about 0.1 to about 6% by volume of the organic material charged.

The present invention is further illustrated with respect to specific embodiments thereof in the following example, which, however, is not intended to limit the generally broad scope of the present invention in strict accordance therewith.

EXAMPLE I

A catalyst for the polymerization of olefinic hydrocarbons was prepared by dissolving 15.01 g. of naphthalene in 200 cc. of carbon tetrachloride. 42.91 g. of a diatomaceous earth, known in the trade as Celite FC, was stirred into the solution. About 90% of the carbon tetrachloride was removed from the resulting slurry at room temperature under vacuum. The resulting dry powdered mixture of naphthalene and Celite FC was stirred into 110.01 g. of polyphosphoric acid which had previously been preheated to a temperature of about 230° F. for 20 minutes. The resulting composite was loaded into a 3/16" die assembly at room temperature and extruded. The extrudate was then cut into 3/16" pills and the pills were kept under an infra-red lamp until they had lost about 11% of their initial weight. The dried pills were then calcined at a temperature of 680° F. for a period of 1.5 hours in a muffle furnace, and designated as catalyst I. During the calcination period, a gentle suction was applied to the furnace and the vapor obtained therefrom was passed through an absorption column. During this calcination, a considerable amount of the naphthalene was driven out of the catalyst pills. The pills lost approximately 10% of the weight (based on the weight recovered from drying on the infra-red lamp). Samples of the resultant catalyst were further calcined in a muffle furnace under gentle suction for a period of one hour, one sample being calcined at a temperature of 860° F.; the other sample being calcined at a temperature of 1040° F. These latter two samples were designated as catalysts II and III respectively. To determine the catalytic activity of these pills, 100 g. (50–50 mole percent) of a propane-propylene feed was contacted with 10 g. of the calcined pills for two hours at a temperature of approximately 450° F. in an 850 cc. rotating bomb. In Table I below the activity and the crushing strength of the catalyst is set forth. In addition, the activity and after use crushing strength of catalysts IV, V and VI, prepared in a manner substantially similar to catalysts I, II and III (but without the addition of a polycyclic aromatic hydrocarbon) is compared with catalysts I, II and III.

Table I

| Catalyst | Calcination | | Percent C₃H₆ Conversion | Crushing Strength | |
|---|---|---|---|---|---|
| | Temp., °F. | Time, hours | | Before | After |
| I | 680 | 1.5 | 80.8 | 21.8+ | 20.8+ |
| II | 840 | 1 | 49.8 | 23.8+ | 25.7+ |
| III | 1,040 | 1 | 25.2 | 22.9 | 23.6+ |
| IV | 680 | 1.5 | 63.5 | 25.9+ | 24.7+ |
| V | 840 | 1 | 47.1 | 26.5+ | 27+ |
| VI | 1,040 | 1 | 9.6 | 26.5+ | 25.9+ |

Therefore it is readily apparent from the comparison of the activities of catalysts I, II and III as hereinbefore set forth in Table I with the activities of catalysts IV, V and VI that the first three catalysts which had been prepared using a polycyclic aromatic hydrocarbon as a starting material in addition to the phosphoric acid and diatomaceous earth exhibited a much greater degree of activity in converting the propane-propylene feed than the last three catalysts in whose preparation no polycyclic aromatic hydrocarbon was used.

I claim as my invention:

1. A process for the manufacture of a solid phosphoric acid catalyst which comprises adding a polycyclic aromatic hydrocarbon to a siliceous adsorbent in an amount of from about 2.2 to about 100% by weight of the adsorbent, compositing a phosphoric acid with the mixture, and extruding and calcining the resultant composite.

2. A process for the manufacture of a solid phosphoric acid catalyst which comprises mixing a polycyclic aromatic hydrocarbon dissolved in an organic solvent with a siliceous adsorbent in an amount of from about 2.2 to about 100% by weight of the adsorbent, removing the organic solvent from the mixture, compositing a phosphoric acid with the remainder of the mixture, and extruding and calcining the resultant composite.

3. A process for the manufacture of a solid phosphoric acid catalyst which comprises adding naphthalene dissolved in an organic solvent to a siliceous adsorbent in an amount of from about 2.2 to about 100% by weight of the adsorbent, removing the organic solvent from the mixture, compositing a phosphoric acid with the remainder of the mixture, and extruding and calcining the resultant composite.

4. A process for the manufacture of a solid phosphoric acid catalyst which comprises adding naphthalene dissolved in carbon tetrachloride to the siliceous adsorbent in an amount of from about 2.2 to about 100% by weight of the adsorbent, removing a carbon tetrachloride from the mixture, compositing a phosphoric acid with the remainder of the mixture, and extruding and calcining the resultant composite.

5. A process for the manufacture of a solid phosphoric acid catalyst which comprises adding anthracene dissolved in benzene to the siliceous adsorbent in an amount of from about 2.2 to about 100% by weight of the adsorbent, removing a benzene from the mixture, compositing a phosphoric acid with the remainder of the mixture, and extruding and calcining the resultant composite.

6. A process for the manufacture of a solid phosphoric acid catalyst which comprises adding phenanthrene dissolved in benzene to the siliceous adsorbent, in an amount of from about 2.2 to about 100% by weight of the adsorbent, removing a benzene from the mixture, compositing a phosphoric acid with the remainder of the mixture, and extruding and calcining the resultant composite.

7. A process for the manufacture of a solid phosphoric acid catalyst which comprises adding chrysene dissolved in toluene to the siliceous adsorbent in an amount of from about 2.2 to about 100% by weight of the adsorbent, removing a toluene from the mixture, compositing a phosphoric acid with the remainder of the mixture, and extruding and calcining the resultant composite.

8. A process for the manufacture of a solid phosphoric acid catalyst which comprises admixing naphthalene dissolved in carbon tetrachloride with a siliceous adsorbent, said naphthalene being in an amount of from about 2.2 to about 100% by weight of the adsorbent, removing the carbon tetrachloride, compositing the remaining mixture with a phosphoric acid, and subjecting the resulting mixture to extrusion and calcination at a temperature in the range of from about 600° to about 1200° F.

9. A process for the manufacture of a solid phosphoric acid catalyst which comprises mixing from about 1 to about 20 parts by weight of naphthalene dissolved in carbon tetrachloride with from about 20 to about 45 parts by weight of a siliceous adsorbent, removing the carbon tetrachloride, compositing the remaining mixture with from about 50 to about 75 parts by weight of a phosphoric acid, subjecting the resulting mixture to extrusion and calcination at a temperature in the range of from about 600° to about 1200° F.

10. A process for the manufacture of a solid phosphoric acid catalyst which comprises mixing from about 1 to about 20 parts by weight of naphthalene dissolved in carbon tetrachloride with from about 20 to about 45 parts by weight of a siliceous adsorbent, removing the carbon tetrachloride, compositing the remaining mixture with from about 50 to about 75 parts by weight of a phosphoric acid at a temperature in the range of from about 50° to about 500° F., and subjecting the resulting mixture to extrusion and calcination at a temperature in the range of from about 600° to about 1200° F.

11. A process for the manufacture of a solid phosphoric acid catalyst which comprises mixing from about 1 to about 20 parts by weight of naphthalene dissolved in carbon tetrachloride with from about 20 to about 45 parts by weight of a siliceous adsorbent, removing the carbon tetrachloride, compositing the remaining mixture with from about 50 to about 75 parts by weight of a phosphoric acid at a temperature in the range of from about 50° to about 500° F., and subjecting the resulting mixture to extrusion and calcination at a temperature in the range of from about 600° to about 1200° F. for a period of time in the range of from about 1 to about 8 hours.

12. A process for the manufacture of a solid phosphoric acid catalyst which comprises admixing from about 1 to about 20 parts by weight of naphthalene dissolved in carbon tetrachloride with from about 20 to about 45 parts by weight of a diatomaceous earth adsorbent, removing the carbon tetrachloride, compositing the remaining mixture with from about 50 to about 75 parts by weight of polyphosphoric acid, subjecting the composited mixture to extrusion, heating, and calcination at a temperature in the range of from about 600° to about 1200° F. for a period of time in the range of from about 1 to about 8 hours.

References Cited in the file of this patent

UNITED STATES PATENTS

| | | |
|---|---|---|
| 2,507,625 | Ehrardt | May 16, 1950 |
| 2,525,144 | Mavity | Oct. 10, 1950 |
| 2,525,145 | Mavity | Oct. 10, 1950 |
| 2,593,720 | Bielawsky | Apr. 22, 1952 |
| 2,596,497 | Mavity | May 13, 1952 |
| 2,691,647 | Field et al. | Oct. 12, 1954 |